Dec. 12, 1939.  C. J. EVANS ET AL  2,183,449
ELECTROMAGNETICALLY OPERATED SWITCH FOR USE IN MOTOR
VEHICLE HEADLIGHT DIPPING ARRANGEMENTS
Filed March 24, 1937  6 Sheets-Sheet 1

C. J. Evans & S. C. Evans, Inventors
By Glascock Downing & Seebold
Attys.

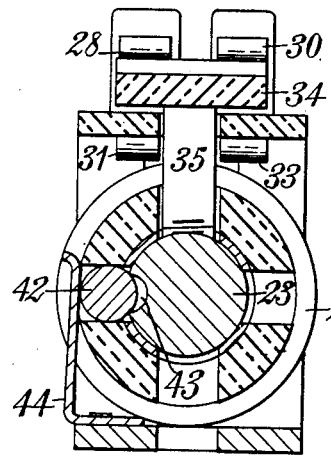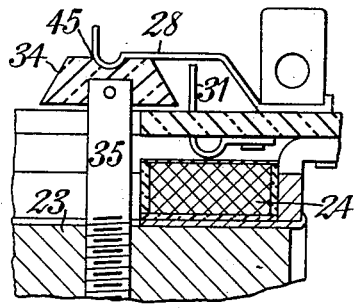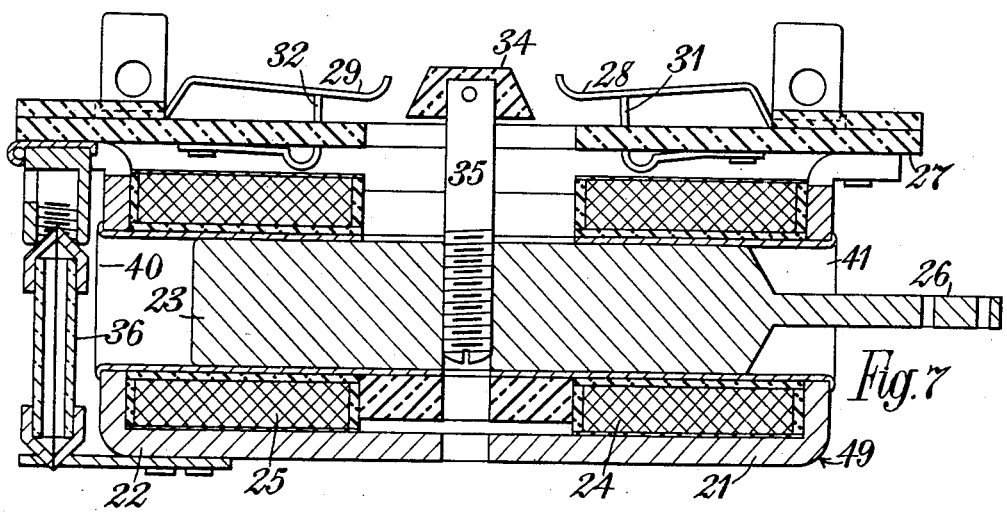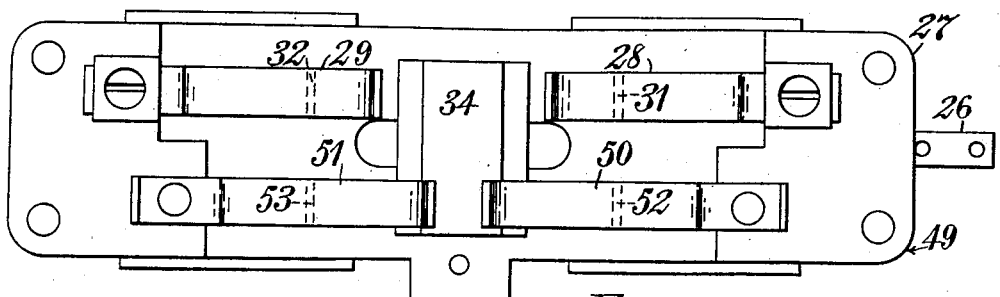

Dec. 12, 1939.   C. J. EVANS ET AL   2,183,449
ELECTROMAGNETICALLY OPERATED SWITCH FOR USE IN MOTOR
VEHICLE HEADLIGHT DIPPING ARRANGEMENTS
Filed March 24, 1937   6 Sheets-Sheet 4

Inventors,
C. J. Evans & S. C. Evans
By: Glascock Downing & Seebold
Attys.

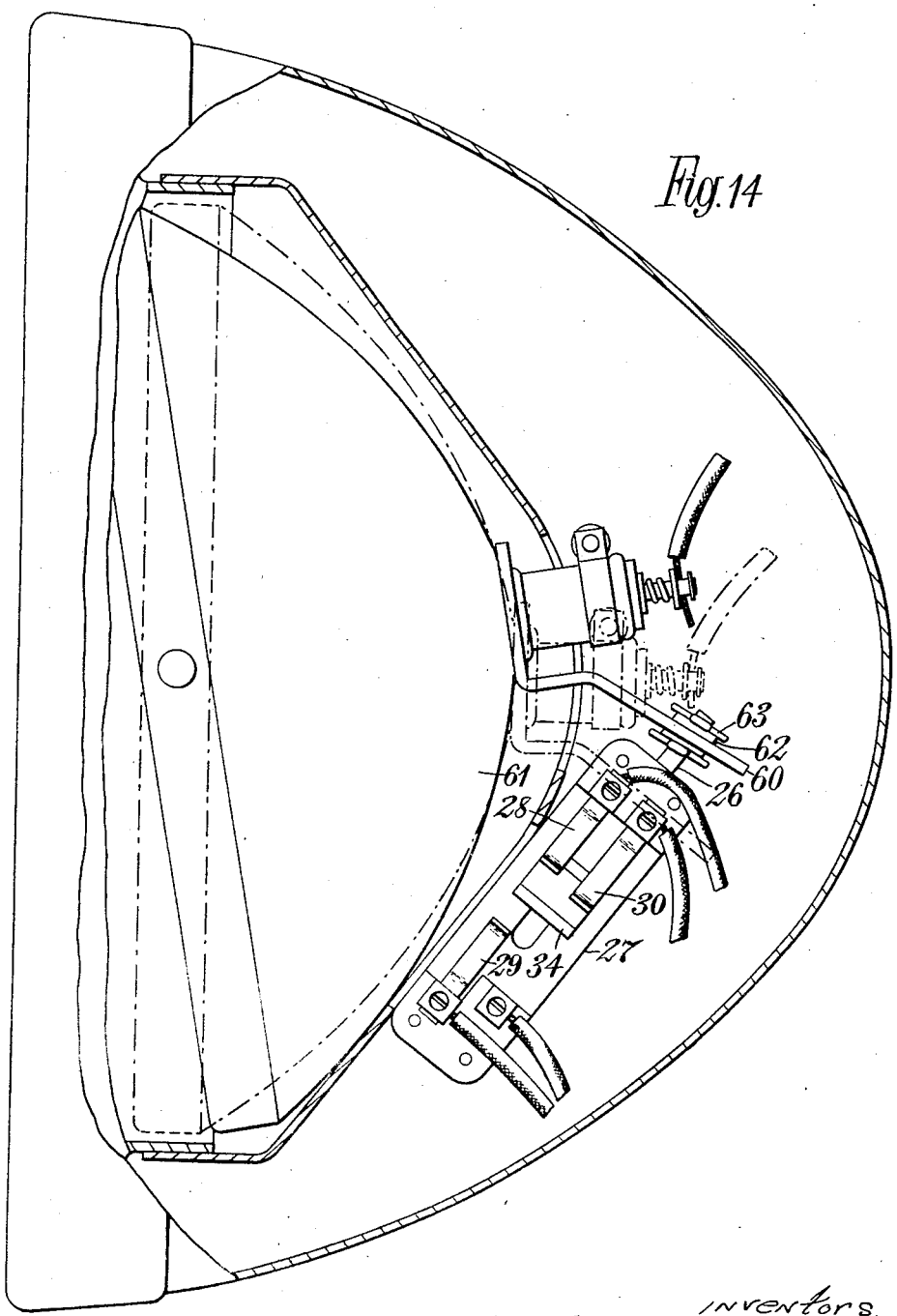

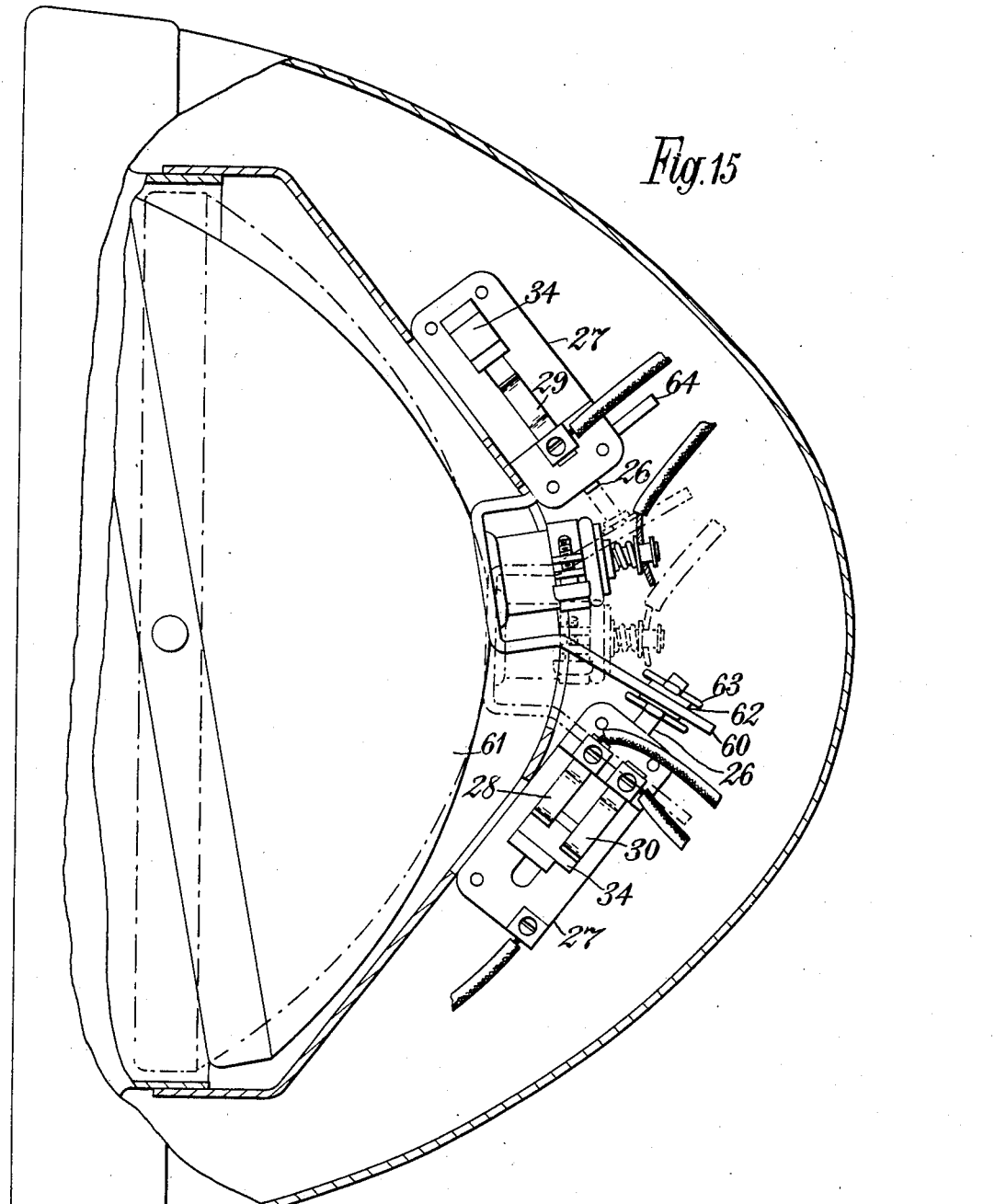

Patented Dec. 12, 1939

2,183,449

UNITED STATES PATENT OFFICE 2,183,449

ELECTROMAGNETICALLY OPERATED SWITCH FOR USE IN MOTOR VEHICLE HEADLIGHT DIPPING ARRANGEMENTS

Charles James Evans and Stanley Charles Evans, Lowestoft, England

Application March 24, 1937, Serial No. 132,872 In Germany March 31, 1936

9 Claims. (Cl. 175—375)

This invention relates to headlight systems of the type in which a beam of light emitted by the system is deflected and/or dipped to one position or to a plurality of positions by electromagnetically operated means.

Electromagnetically operated devices are known for deflecting a beam of light emitted by a motor vehicle lamp to one or to a plurality of positions, in which no provision is made for reducing the current consumption when the beam occupies a deflected position. Other electromagnetic devices are known for dipping one of a pair of lights and extinguishing the other to avoid dazzle when two vehicles are passing each other, wherein a supplementary winding is brought into action by a contact device at the end of the operation of the main winding for reducing the current consumption of the latter, but in these devices the beam is capable of occupying only one dipped position. Furthermore, we have disclosed in our British patent specification No. 449,766 electromagnetic devices for deflecting and/or dipping a beam of light to a plurality of positions in which provision is made for reducing the current consumption when the beam approaches or reaches any one of these positions.

In all these known devices a certain amount of current is consumed for the purpose of retaining the beam in a deflected position, also the return of the beam to its normal position is effected by spring pressure upon interrupting the current supply to the mechanism.

It is the object of the present invention to provide improved electromagnetic means whereby the beam of light is retained in a deflected and/or dipped position without any current consumption, and the return of the beam to its normal position is effected or controlled by the operation of at least one solenoid or electromagnet.

The present invention consists of an electromagnetic light deflecting and/or dipping mechanism comprising at least two electromagnets consisting in part of a slidable core and at least two solenoids whereof one solenoid is employed for effecting or controlling the dipping and/or deflecting movement of the beam of light and one solenoid is employed for effecting or controlling the return movement of the said beam, and means for controlling the solenoids whereby when the beam of light approaches or reaches any one of its positions the solenoid effecting or controlling this movement is de-energised, there being no current consumption for the purpose of retaining the beam of light in its required position.

In one arrangement of the light deflecting and/or dipping mechanism, one of the said solenoids is arranged so that when energised it draws the slidable core in one direction thereby dipping and/or deflecting the beam of light, whilst another solenoid is arranged so that when energised it draws the slidable core in the opposite direction thereby returning the beam towards its normal position. In an alternative arrangement one of the solenoids is arranged so that when energised it draws the slidable core in one direction, and another solenoid is arranged so that when energised it releases a locking or holding device associated with the slidable core or with any other suitable element of the mechanism and thereby allows the beam of light to move in the opposite direction under spring pressure, this second solenoid being de-energised as a consequence of the slidable core moving in the second mentioned direction. If desired, any combination of these two arrangements of the mechanism may be employed, for example the slidable core may be arranged so as to be moved by the combined effect of spring pressure and magnetic influence.

The light deflecting and/or dipping mechanism may be arranged to move the beam of light to one dipped and/or deflected position only. Alternatively, it may be arranged to move the beam to a plurality of dipped and/or deflected positions. In the latter arrangement the normal or straight ahead position of the beam may correspond to either an end position or to an intermediate position of the slidable core. If it corresponds to an end position then the beam may be dipped and/or deflected in one direction only, but if it corresponds to an intermediate position then the beam may be dipped and/or deflected in opposite directions alternatively.

The solenoids of the mechanism may be arranged in any convenient manner. In one arrangement they are all contained in one unit, whilst in an alternative arrangement the operating solenoid forms part of one unit and the returning solenoid forms part of a separate unit, the two units being arranged to work in conjunction one with the other. When the two solenoids are contained in a single unit they may be separated one from the other with the means for controlling their circuits arranged to operate between them, or alternatively the solenoids may be arranged adjacent one to the other with the means for controlling their circuits arranged to operate at one or both ends of the unit.

The mechanism is provided with one or more contact devices for the purpose of controlling the circuits of the solenoids. In a convenient method of carrying the invention into practice the contact devices comprise one or more pivoted or resilient contact blades co-operating with resilient, pivoted or fixed contacts and arranged to be moved into or out of engagement one with the other by operating means carried by the slidable core. If desired the mechanism may be provided with additional contacts for the purpose of controlling the circuit or circuits of other electrical equipment on the vehicle, for example one or more other lights to be extinguished or dimmed.

Any convenient method may be employed for ensuring that the slidable core remains in its required position and is not moved out of position by vibration or the like. One convenient method is to supply current to the contact device corresponding to the required position so that if the core should attempt to move it would immediately be returned or retained in position by a momentarily energisation of the corresponding solenoid. In the case of an intermediate position there may be two contact devices controlling the position one arranged in the circuit of the operating solenoid and the other arranged in the circuit of the returning solenoid, so that supplying current to both these contact devices would prevent the core from moving in either direction.

As an alternative or as an additional method of ensuring that the slidable core is retained in its required position, there may be provided a spring loaded ball or plunger arranged to engage with holes or depressions in the slidable core or in any other suitable element of the mechanism that moves with the slidable core, for example the reflector itself. Alternatively, the spring loaded ball or plunger may be carried by the moving element and the holes be located in a stationary element. As a further alternative, one or more contact blades or spring clips may be arranged to engage with depressions or grooves in a cam associated with the slidable core.

The purpose of the mechanism is to tilt the reflector of the lamp, or cause change in position of one or more reflecting elements and/or refracting elements and/or sources of illumination whereby the beam of light emitted by the lamp is moved to one or to a plurality of deflected and/or dipped positions. If desired, in order to obtain a plurality of deflected and/or dipped positions for the beam of light, a torsional movement may be imparted to the element aforesaid whose position is changed, in addition to a tilting movement being imparted thereto.

The invention is diagrammatically illustrated, by way of example, in the accompanying drawings, wherein:

Figure 5 is a cross sectional view taken on the line 5—5 in Figure 1 and showing a convenient method of preventing the slidable core from being moved out of position by vibration.

Figure 6 is a longitudinal section showing a fragment of the mechanism illustrated in Figure 1 but in which a contact or other blade is arranged to engage with a cam carried by the slidable core for preventing the latter from being moved out of position by vibration.

Figure 7 is a longitudinal section showing a convenient method of arranging the light deflecting and/or dipping mechanism so as to be adapted for moving a beam of light to a plurality of deflected and/or dipped positions.

Figure 8 is a plan view of the mechanism illustrated in Figure 7, and

Figure 14 is a longitudinal section of a portion of a lamp showing one convenient method of arranging the slidable core of the light reflecting and/or dipping mechanism in operative connection with a lateral projection of the reflector.

Figure 15 is a longitudinal section of a lamp showing one convenient method of arranging the slidable cores of the two units mentioned with reference to Figure 13 in operative connection with lateral projections of the reflector.

Like characters indicate like parts throughout the several views.

Figure 1:
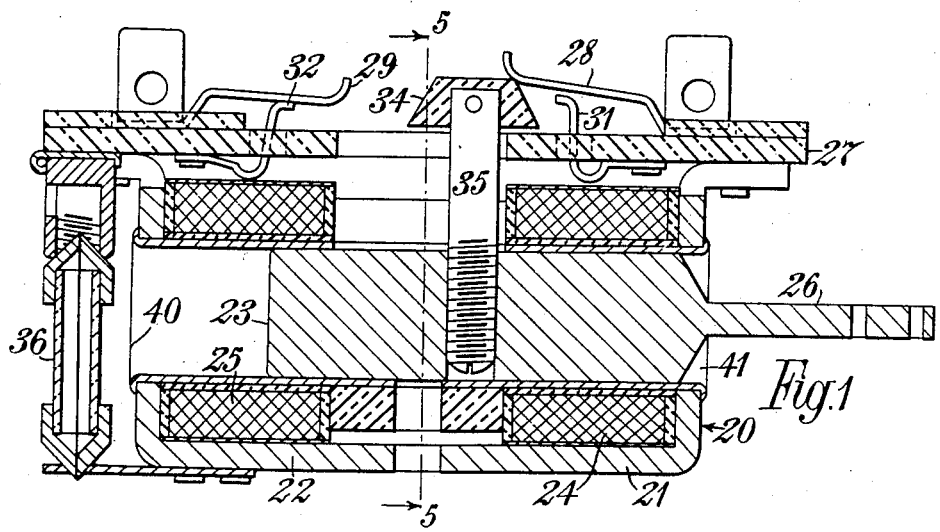
Figure 1 is a longitudinal section showing one convenient method of arranging the light deflecting and/or dipping mechanism so as to be adapted for moving a beam of light to one dipped and/or deflected position.
Figure 2:
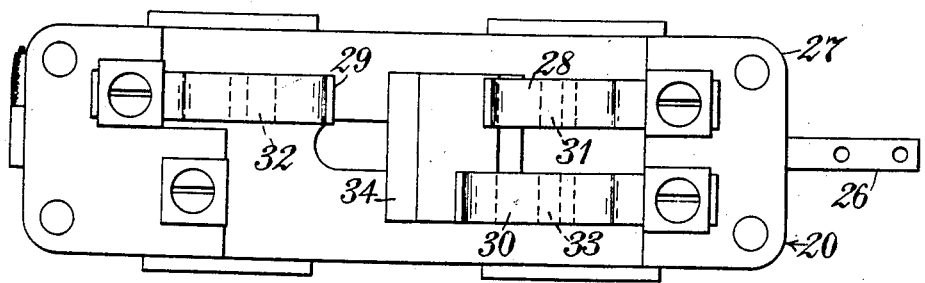
Figure 2 is a plan view of the mechanism shown in Figure 1.

Referring to the drawings, Figures 1 to 5 show an electromagnetic unit 20 suitable for dipping and/or deflecting a beam of light. This unit 20 comprises two electromagnets 21 and 22 of any convenient form. In the unit illustrated the electromagnets 21 and 22 have a slidable core 23 capable of being moved towards the end 41 of the unit by the solenoid 24 or towards the end 40 by the solenoid 25. The slidable core is of any convenient form. In Figure 1 it is provided with a reduced extension 26 whereby motion is imparted from the core 23 to the member to be actuated. This extension 26 illustrated is integral with the main core 23.

The solenoids 24 and 25 may be of any convenient form and arranged in any convenient manner. In the unit 20 the circuits of the solenoids are controlled by contacts carried by an insulating base 27. In this unit 20 there are three pivoted or resilient contact blades 28, 29 and 30 mounted on one side of the base 27 and co-operating with three pivoted, resilient or fixed contacts 31, 32 and 33 mounted on the opposite side of the base 27. These blades 28, 29 and 30 are moved into or out of engagement with their corresponding contacts 31, 32 and 33, respectively, by an operating cam 34 carried by a lateral projection 35 of the slidable core 23. The cam 34 may be arranged in any convenient manner and be composed of either insulating or non-insulating material. If composed of non-insulating material the ends of the blades 28, 29 and 30 adjacent to the cam 35 are insulated.

Figures 3, 4:
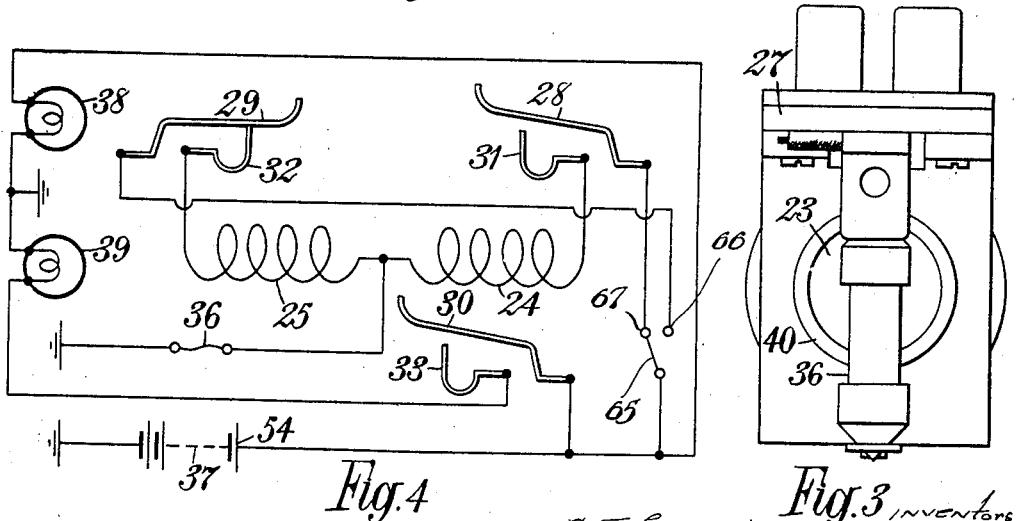
Figure 3 is an end elevation thereof, whilst
Figure 4 is a wiring diagram applicable thereto.

As can be seen from Figure 4, which shows one convenient method of arranging the solenoids of the unit 20, one end of the solenoid 24 is connected to the contact 31, whilst the other end thereof is connected to earth or to one pole of the source of current 37 via the fuse 36. Similarly, one end of the solenoid 25 is connected to the contact 32 whilst the other end thereof is connected also to earth or to the one pole of the source 37. The fuse 36, which serves to protect the solenoids in the event of the mechanism failing to function correctly, may if desired be omitted or arranged in any other convenient manner.

In Figure 4 the circuit of the light that is dipped and/or deflected is represented at 38, whilst the lamp that is extinguished is represented at 39. The circuit of the lamp 39 is controlled by the contacts 30 and 33.

In operation, with the slidable core in the position illustrated, connecting the contact 28 to the remaining pole 54 of the source 37 when the movable switch arm 65 is in engagement with the contact 66, energises the solenoid 25. This causes the core 23 to move towards the end 40 of the unit 20. When the core approaches or reaches this end, the cam 34 moves the contact 29 out of engagement with the contact 32 thereby deenergising the solenoid 25. In order to return the core 23 to the end 41 of the unit 20, the contact 28 is connected to the pole 54 of the source 37, when the movable switch arm 65 is in engagement with the contact 67 thereby energising the solenoid 24, seeing that the contacts 28 and 31 are in engagement when the core is adjacent to the end 40 of the unit. Energising the solenoid 24 draws the core 23 towards the end 41 of the unit and as a consequence of it moving in this direction the contacts 28, 31 and 30, 33 are disconnected and the contacts 29, 32 are connected, thereby deenergising the solenoid 24 and extinguishing the light 39. If it is desired not to extinguish the light 39 by the unit 20, then these contacts 30 and 33 may be omitted, or alternatively, a resistance may be introduced into the circuit of the lamp 39 as a consequence of actuating these contacts 30 and 33 thereby dimming the light.

Figure 5 illustrates one convenient method of preventing the slidable core 23 from being moved out of position by vibration, the means for effecting this comprising a ball 42 which engages with depressions or holes 43 in the core 23 corresponding in number with the number of positions occupied by the core. This ball 42 is held in tension by the resilient member 44. Alternatively, the ball 42 may be replaced by a spring loaded plunger, or any other convenient method may be employed for holding the core in position, for example the cam 34 may be provided with a slot 45 as shown in Figure 6 with which a contact blade or spring clip is arranged to engage. The position determining device may be located on the reflector of the lamp instead of or in addition to being located on the core as aforesaid, or it may be located on any other convenient element of the mechanism. Furthermore, if desired the ball or plunger 42 may be carried by the moving element and arranged to engage holes or depressions located in an adjacent stationary element.

Figure 9:
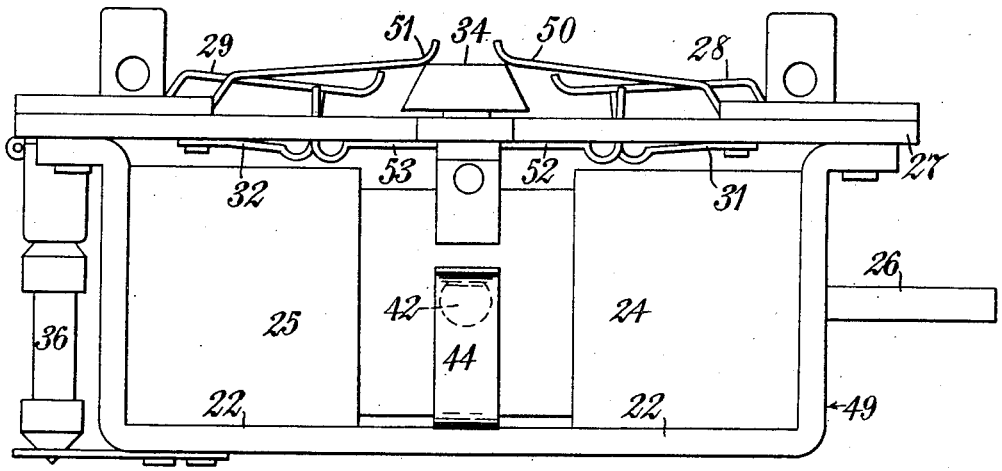
Figure 9 is a side elevation thereof, whilst
Figure 10:
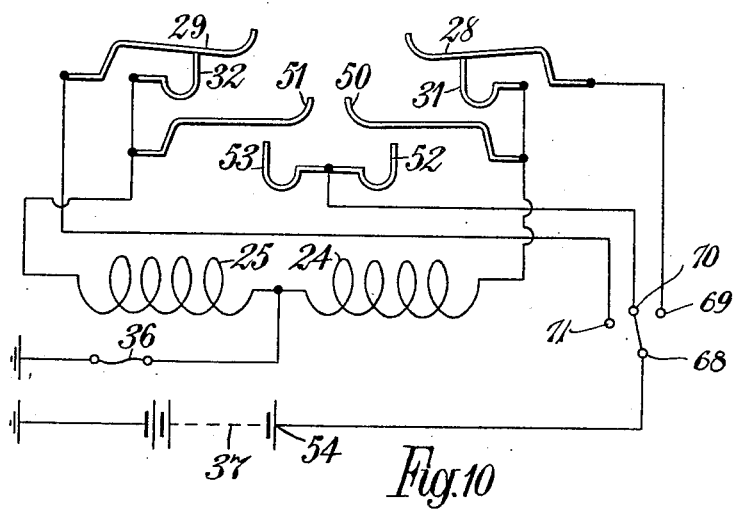
Figure 10 is a wiring diagram applicable thereto.

The unit 49 illustrated in Figures 8, 9 and 10 is similar to the unit 20, differing therefrom only in that the slidable core 23 is capable of occupying more than two positions and thereby being adapted for dipping and/or deflecting a beam of light to a plurality of positions. The slidable core 23 of the unit 49 illustrated is capable of occupying three positions, namely an intermediate position as illustrated, an end position such that the core 23 is adjacent to the end 40 of the unit, and an end position such that the core 23 is adjacent to the end 41 of the unit. There are therefore three depressions or holes in the slidable core with which the ball 42 engages.

In this switch 49 there are two pairs of contacts controlling the intermediate position of the core 23, namely two contact blades 50 and 51 and two lower contacts 52 and 53. The latter contacts are illustrated as being integral one with the other but may be independent if desired. Furthermore, one of these pairs of contacts may be omitted. Other contacts may also be provided if it is desired to extinguish or dim one or more other lights.

As can be seen from Figure 10, one end of the solenoid 24 is connected to the contacts 31 and 50, whilst the other end of the solenoid is connected to the earth or to one pole of the source 37. Similarly, one end of the solenoid 25 is connected to the contacts 32 and 51, whilst the other end thereof is connected to the pole of the source aforesaid.

In operation, with the slidable core 23 in the position illustrated, connecting the contact 28 to the pole 54 of the source 37 when the movable switch arm 69 is in engagement with the contact 69 energises the solenoid 24 and causes the core 23 to move towards the end 41 of the unit. As a consequence of the core moving in this direction, the contacts 28 and 31 are disconnected thereby de-energising the solenoid 24, and the contacts 51 and 53 are connected. Connecting the contact 53 to the pole 54 of the source 37 when the movable switch arm 68 is in engagement with the contact 70, energises the solenoid 25 thereby causing the core 23 to move towards its central position, and when it approaches or reaches this position the contacts 51 and 53 are disconnected and the solenoid again de-energised. If with the movable switch arm 68 in engagement with the contact 71, the contact 28 is now connected to the pole 54 then the core 23 will be drawn towards the end 40 of the unit owing to the solenoid 25 being again energised. Upon the core approaching or reaching the end of its movement the contacts 29 and 32 are again disconnected thereby deenergising the solenoid 25. Connecting the contact 52 to the pole 54 energises the solenoid 24 and consequently causes the core 23 to return to its intermediate position.

The unit 49 may be arranged so that the straight ahead or normal position of the beam of light controlled thereby corresponds to the intermediate position of the core 23, in which case moving the core towards the end 40 of the unit will deflect and/or dip the beam in one direction, whilst moving the core towards the end 41 will deflect and/or dip the beam in the opposite direction. If the unit is arranged so that the core is either adjacent to the end 40 or to the end 41 of the unit when the beam is directed straight ahead or is in its normal position, then the beam may be dipped and/or deflected in one direction only, but in this case there will be a choice of two degrees of movement.

Alternatively, the slidable core may be arranged so as to be capable of occupying more than three positions, in which case additional contacts may be provided, the total number of blades controlling the solenoids corresponding in number with the number of different movements imparted to the slidable core.

The modifications illustrated in Figure 6 may, if desired, be applied to the unit 49 or to a unit having more than three positions for the slidable core 23.

Figures 12, 13:
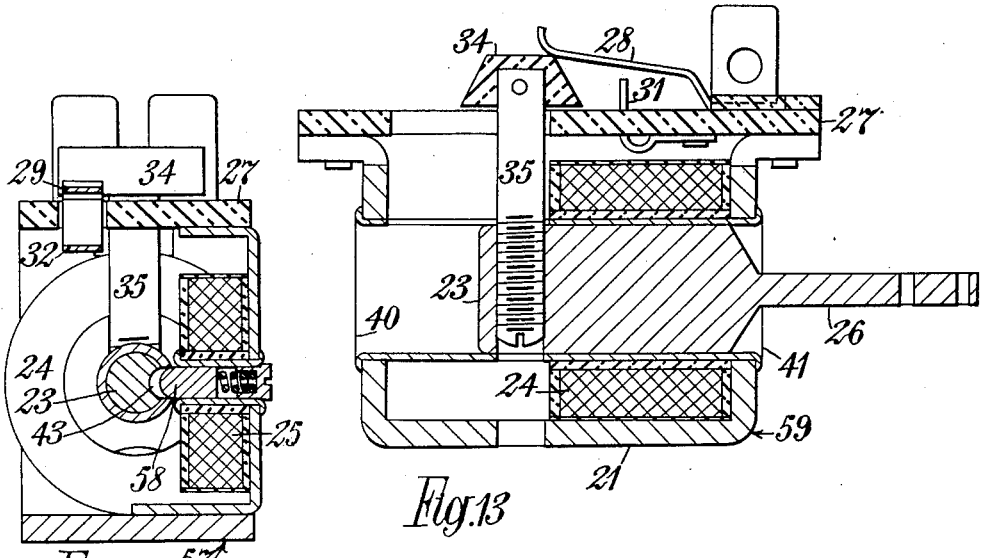
Figure 12 is a cross sectional view taken on the line 12—12 in Figure 11.
Figure 13 is a longitudinal section showing one convenient method of arranging the mechanism so that the operating solenoid forms part of one unit and the returning solenoid forms part of a separate unit.
Figure 11:
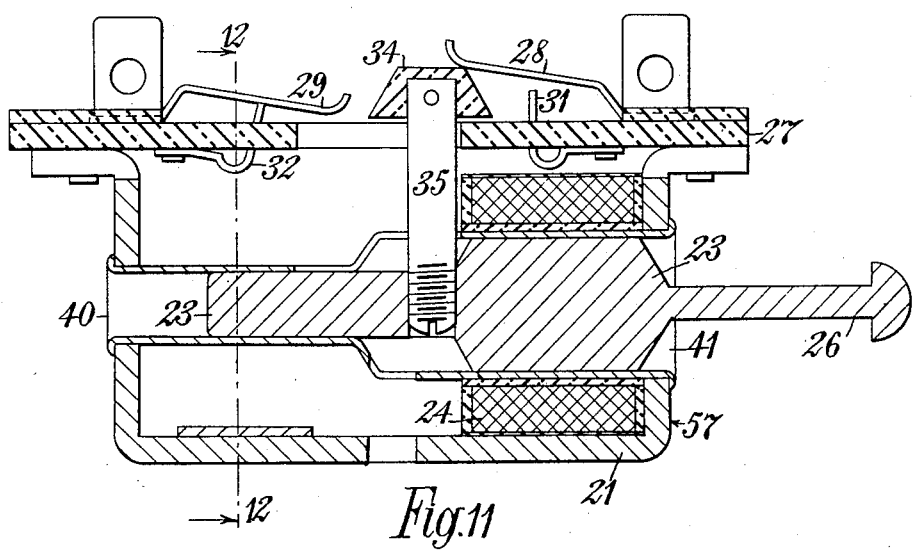
Figure 11 is a longitudinal section showing one convenient method of arranging the mechanism so that one solenoid is employed for drawing the slidable core in one direction and the other solenoid is employed for releasing a locking device associated with the slidable core and thereby allowing the latter to return under spring pressure.

The unit 57 illustrated in Figures 11 and 12 is similar to the units 20 and 49 but differs therefrom in that the solenoid 25 instead of drawing the slidable core 23 towards the end 40 of the unit releases a spring loaded plunger 58 which takes the place of the ball 42 and holds the slidable core 23 firmly in position. Releasing the plunger 58 allows the slidable core to move towards the end 40 of the unit under the tension of a return spring mounted on the reflector or associated with the slidable core. The contacts of the unit 57 may be arranged in any convenient manner, the solenoid 25 being de-energised when the core 23 reaches or approaches the end 40 of the unit. In order to more easily accommodate the solenoid 25 and the plunger 58, the core 23 is reduced at its end adjacent to the end 40 of the unit, otherwise, apart from the location of the solenoid 25, the unit is similar to the units already described.

The outer end of the extension 26 is shown slightly different to that of the previous units, as in this case the projection of the reflector may be held in contact therewith merely by the tension of the return spring, although, if desired the extension 26 may be arranged similarly to that of the units 20, 49 and 55, or in any other convenient manner. The unit 57 may be arranged to move a beam of light to one or to a plurality of dipped and/or deflected positions.

If desired, the unit 57 may be arranged so that the slidable core 23 is not only moved towards the end 40 of the unit by the return spring aforesaid, but is also drawn in this direction by the effect of an additional solenoid arranged similarly to the solenoid 25 of the units 20 and 49. Conversely, the units 20 and 49 may be arranged so that the core 23 is not only moved towards the end 40 of the unit by the effect of the solenoid 25, but is also assisted in its movement in this direction by a return spring mounted on the reflector or associated with the slidable core. The tension of this return spring would in this case be insufficient to move the core out of position without the aid of the solenoid 25. Employing a return spring in this manner in the units 20, 49 and 55 allows a returning solenoid 25 of less power to be used. If desired the extension 26 of the slidable core 23 may be arranged similarly to that of the unit 57 just described.

The unit 59, shown in Figure 13 is similar to the units 20 and 49, differing only in that the units 20 and 49 are the combination of two of the units 59. This unit 59 is intended to work in conjunction with another unit similar to itself, the first unit causing the beam to be moved in one direction and the latter unit returning the beam to its original position. The units 59 may be arranged so that the slidable core 23 is capable of occupying either two positions or more than two positions, and the straight ahead or normal position of the beam of light may correspond to either an intermediate or to an end position of the slidable core, when the latter is capable of occupying more than two positions. As an alternative arrangement, instead of the two units 59 being exactly similar, all the contacts controlling the two solenoids may be carried by one of the units, thereby avoiding the necessity of having a lateral projection 35 and a cam 34 in the second unit, the solenoid of the latter being connected to the contacts of the first unit by means of suitable leads.

The modifications described with reference to Figure 6 apply equally to the units 55, 57 and 59 illustrated in Figures 11, 12 and 13.

The slidable core 23 of the light deflecting and/or dipping mechanism described with reference to Figures 1 to 13 may be utilised in any convenient manner so as to communicate motion to the member to be actuated. For example the unit may be mounted at the rear of the reflector, which may be pivoted in any convenient manner, and arranged so as to work in conjunction with a lateral projection of the rear of the reflector and thereby tilt or turn the reflector about its pivot or rotary axis. One convenient method of arranging this lateral projection 60 of the reflector 61 is shown in Figure 14, in which the extension 26 of the core 23 engages with a slot 62 in the projection 60, where it is held in position by suitable pins 63 or other convenient means. Figure 15 is similar to Figure 14, differing therefrom only in that there are two lateral projections 60 and 64 of the reflector 61 for use when two units are arranged to work in conjunction one with the other, for example, when two units 59 are employed.

With constructions generally as described above fixed cores or stops may be associated with the solenoids to limit the motion imparted to the core elements.

Further, the connection between the core element and the means whereby the displacement of the mirror may be effected may be furnished with shock absorbing springs in the form of metal springs or rubber springs or cushions.

While in the constructions illustrated the solenoids are spaced some distance apart, they may if desired be arranged closely adjacent one to the other in which case the core element may be provided with an extension of non-magnetic material and the position of the switch and the cam element may be modified.

We claim:

1. An electromagnetic switching system comprising two sloenoid units each comprising a baseplate, a solenoid rigidly supported thereon, a core slidably engaged therein and a displaceable member rigidly connected with the core and adapted as a consequence of the slidable movement thereof to be moved from one to another of a plurality of positions, each of said cores being adapted upon energisation of the solenoid of one solenoid unit to be displaced in one direction and upon energisation of the solenoid of the other solenoid unit to be returned to its primary position, a control switch having a movable contact and a plurality of fixed contacts corresponding in number with the number of positions capable of being occupied by each of the displaceable members, means adapted upon movement of the movable contact of the control switch into engagement with one of the fixed contacts to cause the solenoid of one solenoid unit to be energised whereby the core of this unit is caused to move each of the displaceable members and the core of the other solenoid unit each from one to another of its said positions, mechanical locking means adapted to retain each of the cores and displaceable members each in the position to which it is moved upon energisation of the said solenoid so long as the solenoid of the other solenoid unit is de-energised, means adapted upon movement of the movable contact of the control switch into engagement with another fixed contact to cause the solenoid of the other solenoid unit to be energised whereby the core of this unit is caused to return each of the displaceable members and the core of the first solenoid unit each to its primary position, mechanical locking means adapted to retain the cores and displaceable members each in its primary position so long as the solenoid of the first mentioned solenoid unit is de-energised, switching means distinct from the displaceable members secured to the baseplate of one of the solenoid units adapted as each of the cores approaches the end of its movement in the first mentioned direction to be actuated by the displaceable member of this solenoid unit to de-energise the solenoid of the first mentioned solenoid unit, and further switching means distinct from the displaceable members secured to the base-plate of one of the solenoid units adapted as each of the cores approaches the end of its return movement to be actuated by the displaceable member of the solenoid unit carrying the said further switching means to de-energise the solenoid of the second mentioned solenoid unit.

2. An electromagnetic switching system comprising two solenoid units each comprising a baseplate, a solenoid rigidly supported thereon, a core slidably engaged therein and a displaceable member rigidly connected with the core and adapted as a consequence of the slidable movement thereof to be moved from one to another of a plurality of positions, each of said cores being adapted upon energisation of the solenoid of one solenoid unit to be displaced in one direction and upon energisation of the solenoid of the other solenoid unit to be returned to its primary position, a light controlling member arranged in operative connection with the cores and adapted as a consequence of the slidable movement thereof to be moved from one to another of a plurality of positions, a control switch having a movable contact and a plurality of fixed contacts corresponding in number with the number of positions capable of being occupied by each of the displaceable members, means adapted upon movement of the movable contact of the control switch into engagement with one of the fixed contacts to cause the solenoid of one solenoid unit to be energised whereby the core of this unit is caused to move the light controlling member together with each of the displaceable members and the core of the other solenoid unit each from one to another of its said positions, mechanical locking means adapted to retain the light controlling member together with each of the cores and displaceable members each in the position to which it is moved upon energisation of the said solenoid so long as the solenoid of the other solenoid unit is de-energised, means adapted upon movement of the movable contact of the control switch into engagement with another fixed contact to cause the solenoid of the other solenoid unit to be energised whereby the core of this unit is caused to return the light controlling member together with each of the displaceable members and the core of the first solenoid unit each to its primary position, mechanical locking means adapted to retain the light controlling member together with each of the cores and displaceable members each in its primary position so long as the solenoid of the first mentioned solenoid unit is de-energised, switching means distinct from the displaceable members secured to the baseplate of one of the solenoid units adapted as each of the cores approaches the end of its movement in the first mentioned direction to be actuated by the displaceable member of this solenoid unit to de-energise the solenoid of the first mentioned solenoid unit, and further switching means distinct from the displaceable members secured to the baseplate of one of the solenoid units adapted as each of the cores approaches the end of its return movement to be actuated by the displaceable member of the solenoid unit carrying the said further switching means to de-energise the solenoid of the second mentioned solenoid unit.

3. An electromagnetic switching system comprising two solenoid units each comprising a baseplate, a solenoid rigidly supported thereon, a core slidably engaged therein, and a displaceable member rigidly connected with the core and adapted as a consequence of the slidable movement thereof to be moved into a plurality of positions, each of said cores being adapted upon energisation of the solenoid of one solenoid unit to be displaced in one direction and upon energisation of the solenoid of the other solenoid unit to be displaced in the opposite direction, a light controlling member arranged in operative connection with the cores and adapted as a consequence of the slidable movement thereof to be moved into a plurality of positions, a control switch having a movable contact and a plurality of fixed contacts corresponding in number with the number of positions capable of being occupied by each of the displaceable members, means adapted upon movement of the movable contact of the control switch into engagement with one of the fixed contacts to cause the solenoid of one solenoid unit to be energised whereby the core of this unit is caused to move the light controlling member together with each of the displaceable members and the core of the other solenoid unit each to one of its said positions, mechanical locking means adapted to retain the light controlling member together with each of the cores and displaceable members each in the position to which it is moved upon energisation of the said solenoid so long as the solenoid of the other solenoid unit is de-energised, means adapted upon movement of the movable contact of the control switch into engagement with another fixed contact to cause the solenoid of the other solenoid unit to be energised whereby the core of this unit is caused to return the light controlling member together with each of the displaceable members and the core of the first solenoid unit each to its primary position, mechanical locking means adapted to retain the light controlling member together with each of the cores and displaceable members each in its primary position so long as the solenoids of both solenoid units are de-energised, means adapted upon movement of the movable contact of the control switch into engagement with a further fixed contact to cause the solenoid of the last mentioned solenoid unit to be energised whereby the core of this unit is caused to move the light controlling member together with each of the displaceable members and the core of the other solenoid unit each to another of its said positions, mechanical locking means adapted to retain the light controlling member together with each of the cores and displaceable members each in the position to which it is moved upon energisation of the solenoid of the last mentioned solenoid unit so long as the solenoid of the other unit is de-energised, means adapted upon movement of the movable contact of the control switch into engagement with the second mentioned fixed contact to cause the solenoid of the first mentioned unit to be energised whereby the core of this unit is caused to return the light controlling member together with each of the displaceable members and the core of the other unit each to its primary position, switching means distinct from the displaceable members secured to the baseplate of one of the solenoid units and adapted as each of the cores approaches its first mentioned displaced position to be actuated by the displaceable member of this unit to de-energise the solenoid of the first mentioned unit, further switching means distinct from the displaceable members secured to the baseplate of one of the solenoid units and adapted as each of the cores approaches its primary position after having occupied its first mentioned displaced position to be actuated by the displaceable member of this unit to de-energise the solenoid of the second mentioned unit, additional switching means distinct from the displaceable members secured to the baseplate of one of the solenoid units and adapted as each of the cores approaches its second mentioned displaced position to be actuated by the displaceable member of this unit to de-energise the solenoid of the second mentioned unit, and further additional switching means distinct from the displaceable members secured to the baseplate of one of the solenoid units adapted as each of the cores approaches its primary position after having occupied its second mentioned displaced position to be actuated by the displaceable member of this unit to de-energise the solenoid of the first mentioned unit.

4. An electromagnetic switching system comprising a baseplate, two solenoids rigidly supported thereon, a core slidably engaged in the solenoids adapted upon energisation of one of the solenoids to be displaced in one direction and upon energisation of the other solenoid to be returned to its primary position, a displaceable member rigidly connected with the core and adapted as a consequence of the slidable movement thereof to be moved from one to another of a plurality of positions, a light controlling member arranged in operative connection with the core and adapted as a consequence of the slidable movement thereof to be moved from one to another of a plurality of positions, a control switch having a movable contact and a plurality of fixed contacts corresponding in number with the number of positions capable of being occupied by the displaceable member, means adapted upon movement of the movable contact of the control switch into engagement with one of the fixed contacts to cause one of the solenoids to be energised whereby the core is caused to move the light controlling member and the displaceable member each from one to another of its said positions, mechanical locking means adapted to retain the light controlling member together with the core and the displaceable member each in the position to which it is moved upon energisation of the said solenoid so long as the other solenoid is de-energised, means adapted upon movement of the movable contact of the said control switch into engagement with another fixed contact to cause the other solenoid to be energised whereby the core is caused to return the light controlling member and the displaceable member each to its primary position, mechanical locking means adapted to retain the light controlling member together with the core and displaceable member each in its primary position so long as the first mentioned solenoid is de-energised, switching means distinct from the displaceable member secured to the baseplate and adapted as the core approaches the end of its movement in the first mentioned direction to be actuated by the displaceable member to de-energise the first mentioned solenoid, and further switching means distinct from the displaceable member secured to the baseplate and adapted as the core approaches the end of its return movement to be actuated by the displaceable member to de-energise the other solenoid.

5. An electromagnetic switching system comprising a baseplate, two solenoids rigidly supported thereon, a core slidably engaged in the solenoids adapted upon energisation of one of the solenoids to be displaced in one direction and upon energisation of the other solenoid to be displaced in the opposite direction, a displaceable member rigidly connected with the core and adapted as a consequence of the slidable movement thereof to be moved into a plurality of positions, a light controlling member arranged in operative connection with the core and adapted as a consequence of the slidable movement thereof to be moved into a plurality of positions, a control switch having a movable contact and a plurality of fixed contacts corresponding in number with the number of positions capable of being occupied by the displaceable member, means adapted upon movement of the movable contact of the said control switch into engagement with one of the fixed contacts to cause one of the solenoids to be energised whereby the core is caused to move the light controlling member and the displaceable member each to one of its said positions, mechanical locking means adapted to retain the light controlling member together with the core and the displaceable member each in the position to which it is moved upon energisation of the said solenoid so long as the other solenoid is de-energised, means adapted upon movement of the movable contact of the control switch into engagement with another fixed contact to cause the other solenoid to be energised whereby the core is caused to return the light controlling member and the displaceable member each to its primary position, mechanical locking means adapted to retain the light controlling member together with the core and displaceable member each in its primary position so long as both solenoids are de-energised, means adapted upon movement of the movable contact of the control switch into engagement with a further fixed contact to cause the last mentioned solenoid to be energised whereby the core is caused to move the light controlling member and the displaceable member each to another of its said positions, mechanical locking means adapted to retain the light controlling member together with the core and displaceable member each in the position to which it is moved upon energisation of the last mentioned solenoid so long as the first mentioned solenoid is de-energised, means adapted upon movement of the movable contact of the control switch into engagement with the second mentioned fixed contact to cause the first mentioned solenoid to be energised whereby the core is caused to return the light controlling member and the displaceable member each to its primary position, switching means distinct from the displaceable member secured to the baseplate and adapted as the core approaches its first mentioned displaced position to be actuated by the displaceable member to de-energise the first mentioned solenoid, further switching means distinct from the displaceable member secured to the baseplate and adapted as the core approaches its primary position after having occupied its first mentioned displaced position to be actuated by the displaceable member to de-energise the second mentioned solenoid, additional switching means distinct from the displaceable member secured to the baseplate and adapted as the core approaches its second mentioned displaced position to be actuated by the displaceable member to de-energise the second mentioned solenoid, and further additional switching means distinct from the displaceable member secured to the baseplate and adapted as the core approaches its primary position after having occupied its second mentioned displaced position to be actuated by the displaceable member to de-energise the first mentioned solenoid.

6. An electromagnetic switching system comprising a baseplate, two solenoids rigidly supported thereon, a core slidably engaged in one solenoid adapted upon energisation thereof to be displaced in one direction, a displaceable member rigidly connected with the core and adapted as a consequence of the slidable movement thereof to be moved from one to another of a plurality of positions, a light controlling member arranged in operative connection with the core and adapted as a consequence of the slidable movement thereof to be moved from one to another of a plurality of positions, electromagnetic locking means whereof the other of the said solenoids forms part adapted to retain the light controlling member together with the core and displaceable member each in the position to which it is moved upon energisation of the first mentioned solenoid so long as the solenoid of the locking means is de-energised, resilient means adapted to urge the light controlling member together with the core and displaceable member each towards its primary position, a control switch having a movable contact and a plurality of fixed contacts corresponding in number with the number of positions capable of being occupied by the displaceable member, means adapted upon movement of the movable contact of the control switch into engagement with one of the fixed contacts to cause the first mentioned solenoid to be energised whereby the core is caused to move the light controlling member and the displaceable member each from one to another of its said positions, means adapted upon movement of the movable contact of the control switch into engagement with one of the fixed contacts to cause the first mentioned solenoid to be energised whereby the core is caused to move the light controlling member and the displaceable member each from one to another of its said positions, means adapted upon movement of the movable contact of the control switch into engagement with another fixed contact to cause the solenoid of the electromagnetic locking means to be energised whereby the light controlling member together with the core and displaceable member is allowed to return each to its primary position under the influence of the said resilient means, switching means distinct from the displaceable member secured to the baseplate and adapted as the core approaches the end of its movement in the first mentioned direction to be actuated by the displaceable member to de-energise the first mentioned solenoid, and further switching means distinct from the displaceable member secured to the baseplate and adapted as the core approaches the end of its return movement to be actuated by the displaceable member to de-energise the solenoid of the electromagnetic locking means.

7. An electromagnetic switching system comprising a baseplate, two solenoids rigidly supported thereon, a core slidably engaged in one solenoid adapted upon energisation thereof to be displaced in one direction, a displaceable member rigidly connected with the core and adapted as a consequence of the slidable movement thereof to be moved into a plurality of positions, a light controlling member arranged in operative connection with the core and adapted as a consequence of the slidable movement thereof to be moved into a plurality of positions, electromagnetic locking means whereof the other of said solenoids forms part adapted to retain the light controlling member together with the core and the displaceable member each in its said positions, resilient means adapted to urge the light controlling member together with the core and displaceable member each towards the end of its movement in the direction opposite to that in which it is moved upon energisation of the first mentioned solenoid, a control switch having a movable contact and a plurality of fixed contacts corresponding in number with the number of positions capable of being occupied by the displaceable member, means adapted upon movement of the movable contact of the control switch into engagement with one of the fixed contacts to cause the first mentioned solenoid to be energised whereby the core is caused to move the light controlling member and the displaceable member each to one of its said positions, means adapted upon movement of the movable contact of the control switch into engagement with another fixed contact to cause the solenoid of the electromagnetic locking means to be energised whereby the light controlling member together with the core and the displaceable member is allowed to return each to its primary position under the influence of the said resilient means, means adapted upon movement of the movable contact of the control switch into engagement with a further fixed contact to cause the solenoid of the electromagnetic locking means to be energised whereby the light controlling member together with the core and the displaceable member is allowed each to be moved to another of its said positions under the influence of the said resilient means, means adapted upon movement of the movable contact of the control switch into engagement with the second mentioned fixed contact to cause the first mentioned solenoid to be energised whereby the core is caused to move the light controlling member and the displaceable member each to its primary position, switching means distinct from the displaceable member secured to the baseplate and adapted as the core approaches its first mentioned displaced position to be actuated by the displaceable member to de-energise the first mentioned solenoid; further switching means distinct from the displaceable member secured to the baseplate and adapted as the core approaches its primary position after having occupied its first mentioned displaced position to be actuated by the displaceable member to de-energise the solenoid of the electromagnetic locking means, additional switching means distinct from the displaceable member secured to the baseplate and adapted as the core approaches its second mentioned displaced position to be actuated by the displaceable member to de-energise the solenoid of the electromagnetic locking means, further additional switching means distinct from the displaceable member secured to the baseplate and adapted as the core approaches its primary position after having occupied its second mentioned displaced position to be actuated by the displaceable member to de-energise the first mentioned solenoid.

8. An electromagnetic switching system as claimed in claim 4, in which each solenoid is constituted by a single winding and in which the said switching means adapted to be actuated by the displaceable member or members comprises further switches corresponding in number with the said number of positions, each of said further switches having a movable contact and a relatively fixed contact whereof one is connected with one of the said fixed contacts of the control switch and the other is connected with one end of one or other of said solenoids, a source of electrical energy having one pole thereof connected with the movable contact of the control switch and the other pole thereof connected with the ends of the two solenoids remote from their connection with the contacts of the said further switches whereby as a consequence of movement of the core or each of the cores under the influence of the magnetic field set up in the winding of one or other solenoid when the movable contact of the control switch is brought into engagement with one of the fixed contacts the said displaceable member is caused to open the movable and relatively fixed contacts of one of said further switches, thereby interrupting the flow of electric current through one or other solenoid and maintaining the light controlling member together with the core and displaceable member or each of the cores and displaceable members, each in the position to which it is moved upon energisation of the said solenoid so long as the movable contact of the control switch is out of engagement with the remaining fixed contacts thereof.

9. An electromagnetic switching system as claimed in claim 4 in which each solenoid is constituted by a single winding and in which the switching means or part thereof comprises further switches having a plurality of contacts whereof one is arranged to be brought into engagement alternatively with either of at least two further contacts, the first mentioned contact being connected with one of the contacts of the said control switch and the two further contacts being connected respectively with one end of one or other of said solenoids, a source of electrical energy having one pole thereof connected with another contact of the control switch which is adapted to be brought into engagement with the first mentioned contact of the control switch, the other pole of the source of electrical energy being connected with the ends of the two solenoids remote from their connection with the said further contacts of the said further switches, whereby as a consequence of movement of the core or each of the cores under the influence of the magnetic field set up in the winding of one of the solenoids when the said contacts of the control switch are brought into engagement one with the other the said displaceable member is caused to move the first mentioned contact of the said further switches out of engagement with the corresponding further contact thereby interrupting the flow of electric current through the said solenoid and maintaining the light controlling member together with the core and displaceable member or each of the cores and displaceable members each in the position to which it is moved upon energisation of the said solenoid so long as the other solenoid is de-energised.

CHARLES JAMES EVANS.
STANLEY CHARLES EVANS.